US009531669B2

(12) United States Patent
Fischer et al.

(10) Patent No.: US 9,531,669 B2
(45) Date of Patent: Dec. 27, 2016

(54) BI-DIRECTIONAL DATA SECURITY FOR SUPERVISOR CONTROL AND DATA ACQUISITION NETWORKS

(71) Applicant: Sierra Nevada Corporation, Sparks, NV (US)

(72) Inventors: Peter Fischer, Highlands Ranch, CO (US); Andrew Feldkamp, Littleton, CO (US); Nelson Rodriguez, Highlands Ranch, CO (US); Joshua Edwards, Castle Roak, CO (US)

(73) Assignee: Sierra Nevada Corporation, Sparks, NV (US)

( * ) Notice: Subject to any disclaimer, the term of this patent is extended or adjusted under 35 U.S.C. 154(b) by 270 days.

(21) Appl. No.: 14/168,283

(22) Filed: Jan. 30, 2014

(65) Prior Publication Data

US 2015/0215279 A1    Jul. 30, 2015

(51) Int. Cl.
*H04L 29/06* (2006.01)
(52) U.S. Cl.
CPC ........... *H04L 63/02* (2013.01); *H04L 63/1408* (2013.01)
(58) Field of Classification Search
CPC .............................. H04L 63/02; H04L 63/1408
USPC ............................................................. 726/11
See application file for complete search history.

(56) References Cited

U.S. PATENT DOCUMENTS 4,019,174 A * 4/1977 Vanderpool ........... G06F 3/0227
345/169
5,157,769 A * 10/1992 Eppley ................ G06F 13/4068
327/321
5,327,546 A * 7/1994 Yokoi .................. G05B 19/042
700/23
6,502,003 B1 * 12/2002 Jacobs .................. G06F 1/1616
700/90
7,356,736 B2    4/2008 Natvig
7,649,452 B2    1/2010 Zilberstein et al.
8,069,372 B2   11/2011 Natvig
(Continued)

FOREIGN PATENT DOCUMENTS

EP    2175603    4/2010

OTHER PUBLICATIONS

International Search Report and Written Opinion on corresponding PCT application (PCT/US2015/011249) from International Searching Authority (KIPO) dated Apr. 22, 2015.
(Continued)

*Primary Examiner* — John B King
(74) *Attorney, Agent, or Firm* — Klein, O'Neill & Singh, LLP (57) ABSTRACT

A cyber-security device provides secure communications bi-directionally between an external network and an internal network including a supervisor control and data acquisition (SCADA) device. The device includes a processor in data communication with the external and internal networks, the processor being programmed with a rule-set establishing validation criteria configured to validate data received from the external and internal networks. The processor is operable in an operational mode to pass between the external and internal networks only data that are compliant with the validation criteria. The processor is re-programmable with a new rule-set only in a programming mode. The device includes a switch that is manually operable to switch the processor from the operational mode to the programming mode.

21 Claims, 6 Drawing Sheets

(56) References Cited

U.S. PATENT DOCUMENTS

| | | | |
|---|---|---|---|
| 8,578,362 B2 * | 11/2013 | Brescia | G06F 8/65 |
| | | | 713/2 |
| 2003/0005331 A1 | 1/2003 | Williams | |
| 2003/0093519 A1 | 5/2003 | Jackson et al. | |
| 2010/0036992 A1 | 2/2010 | Sisto et al. | |
| 2010/0095367 A1 | 4/2010 | Narayanaswamy | |
| 2010/0277270 A1 | 11/2010 | Aikens et al. | |
| 2010/0287603 A1 | 11/2010 | Alexander et al. | |
| 2011/0039237 A1 | 2/2011 | Skare | |
| 2011/0249816 A1 | 10/2011 | Choi et al. | |
| 2012/0144187 A1 | 6/2012 | Wei et al. | |
| 2015/0135254 A1 | 5/2015 | Thilenius et al. | |

OTHER PUBLICATIONS

International Search Report on corresponding PCT application (PCT/US2016/023225) from International Searching Authority (USPTO) dated Jun. 6, 2016.
Written Opinion on corresponding PCT application (PCT/US2016/023225) from International Searching Authority (USPTO) dated Jun. 6, 2016.
Non-Final Office Action on co-pending U.S. Appl. No. 14/668,602 dated Apr. 22, 2016.
Final Office Action on co-pending U.S. Appl. No. 14/668,602 dated Nov. 4, 2016.

\* cited by examiner

BI-DIRECTIONAL DATA SECURITY FOR SUPERVISOR CONTROL AND DATA ACQUISITION NETWORKS

CROSS-REFERENCE TO RELATED APPLICATIONS

Not Applicable.

FEDERALLY SPONSORED RESEARCH OR DEVELOPMENT

Not Applicable.

BACKGROUND

This disclosure relates generally to the field of cybersecurity for automation and control systems that are monitored and/or controlled over public or private internet protocol (IP) networks. More specifically, it relates to a device and a method for providing secure communications to and from one or more supervisor control and data acquisition (SCADA) devices in such automation and control systems.

Supervisor Control and Data Acquisition (SCADA) devices, such as switches, meters, and sensors, enable real-time monitoring and control of automation and control systems over public or private internet protocol (IP) networks. Most SCADA devices utilize communication protocols, such as Distributed Network Protocol V3.0 (DNP3), which are not designed with robust built-in security. Thus, these networked devices are susceptible to cyber-terrorism and other malicious attacks, such as social engineer and man-in-the-middle attacks, from internal or external networks, whether connected to private local networks or the public internet. This poses a serious cyber-security challenge and risk to critical infrastructure in many industries, such as, for example, petroleum refining, natural gas processing, chemical processing, power generation and distribution, and water purification.

Figure 1:
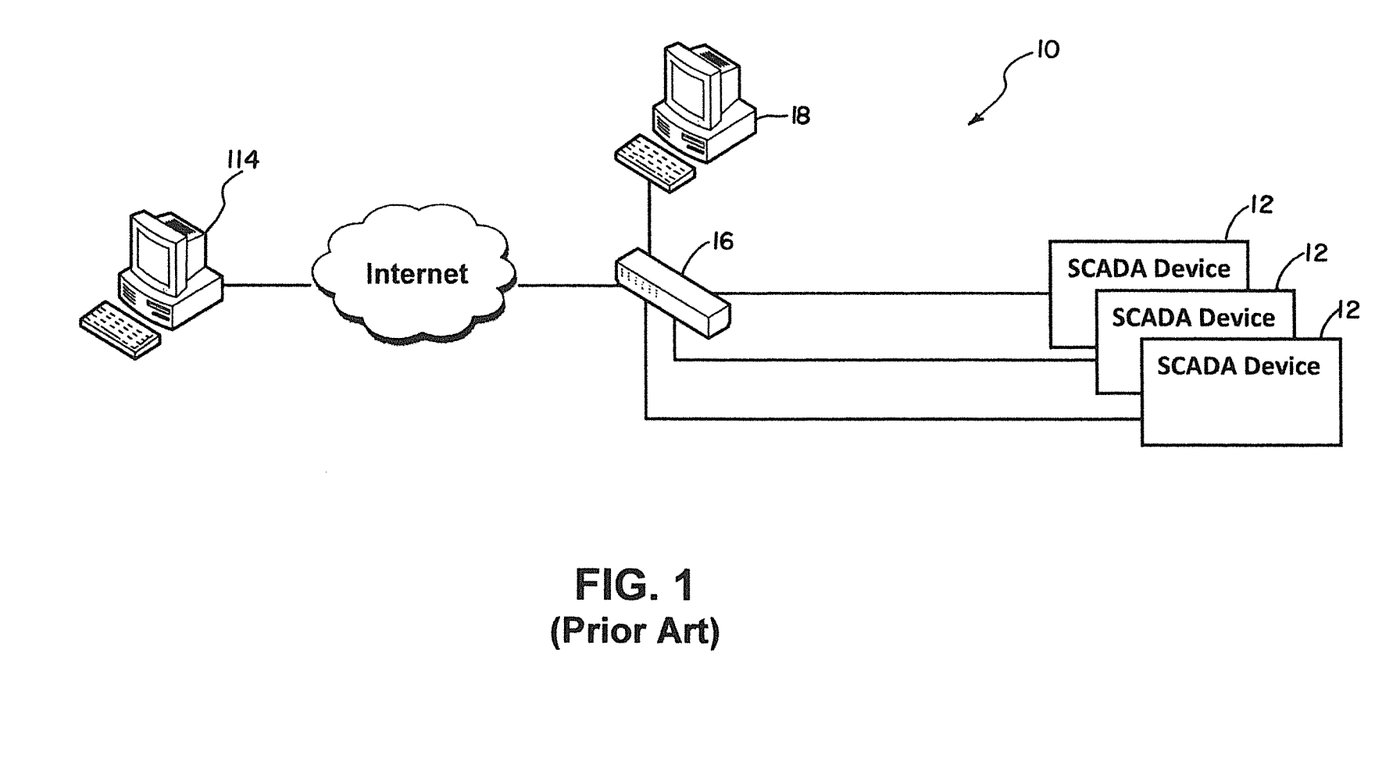
FIG. 1 is a simplified semi-schematic representation of a conventional unsecured SCADA network, as described above under "BACKGROUND;"

FIG. 1 illustrates a conventional SCADA network 10 of automation and control devices. The network 10 includes a plurality of SCADA devices 12 linked to an external or remote SCADA control terminal 14 by a network communication device 16, such as, for example, a router. Communication between the remote terminal 14 and the communication device 16 may be through the Internet (as shown), or alternatively, through a Local Area Network (LAN) or a Wide Area Network (WAN). A local or internal SCADA control terminal 18 may also be linked to the SCADA devices 12 and the external control terminal 14 by the communication device 16.

Commercially available options exist for providing a degree of security for networks such as the network 10 shown in FIG. 1. Some options, that operate at the transport layer or higher, such as firewalls, security proxies, intrusion detection systems, and application layer solutions, do not provide physical network segregation. Physical and data-link layer specific solutions, such as network segregation, do not protect against attacks that originate from the internal\segregated network, and they present additional integration issues for SCADA control networks.

Accordingly, a solution has been sought to the problem of ensuring cyber-security for SCADA networks by protecting them from both internal and external attacks and threats. Moreover, it would be advantageous to provide such protection bi-directionally; that is, by protecting both incoming data (data coming into the SCADA devices from the network with which the device is linked) and outgoing data (data communicated from the SCADA devices to the network).

SUMMARY

Broadly, in accordance with at least some embodiments of this disclosure, a bi-directional cyber-security ("data guard") device for a SCADA network is installed in-line between each SCADA device and a network (either internal or external) to protect each SCADA device from attack, and to validate the integrity of all data and commands sent to each SCADA device and all information sent from each SCADA device to the network for further dissemination. The bi-directional SCADA network cyber-security or "data guard" device provides protection across all seven OSI model layers by installing a physical hardware "firewall" between each SCADA device and the network, with a customizable rule-set programmed into the device for processing inbound and outbound data (commands and messages), passing only validated data, and deleting or blocking data that do not conform to validation criteria established by the rule-set. The rule-set can be customized for each SCADA device and the control network. Preferably, and advantageously, separate rule sets are provided to define how inbound and outbound data are processed, and either blocked or validated.

More specifically, a cyber-security device in accordance with embodiments of this disclosure comprises a processor programmed with a data validation rule-set (preferably separate data validation rule-sets for inbound and outbound data); an external communication interface configured for bi-directional data communication between the processor and an external network; and an internal communication interface configured for bi-directional data communication between the processor and at least one SCADA device, wherein the data received by the processor via either the external or internal communication interface is either blocked or passed by the appropriate rule-set, depending on whether the data conform to validation criteria established by the rule-set. The processor analyzes the data, preferably byte-by-byte, with the data in each byte being required to conform to the rule-set validation criteria before being passed from the processor to the appropriate interface. The processor may also be configured to be re-programmed with new rule-sets during start-up ("re-booting"), but only when a programming switch, preferably a physical hardware switch, is actuated during start-up, thereby assuring that the security provided by the rule-set validation criteria cannot be defeated or compromised without physical access to the cyber-security device.

In accordance with another aspect of the disclosure, a method of validating data transmitted between an internal network including a SCADA device and an external network comprises, in at least some embodiments, (a) providing a processor programmed with a rule-set establishing data validation criteria; (b) communicating data to the processor from one of the internal and external networks; (c) operating the processor to determine if the data conform to the data validation criteria established by the rule-set; and (d) communicating the data from the processor to the other of the internal and external networks only if the data conform to the validation criteria.

DETAILED DESCRIPTION

Figure 2:
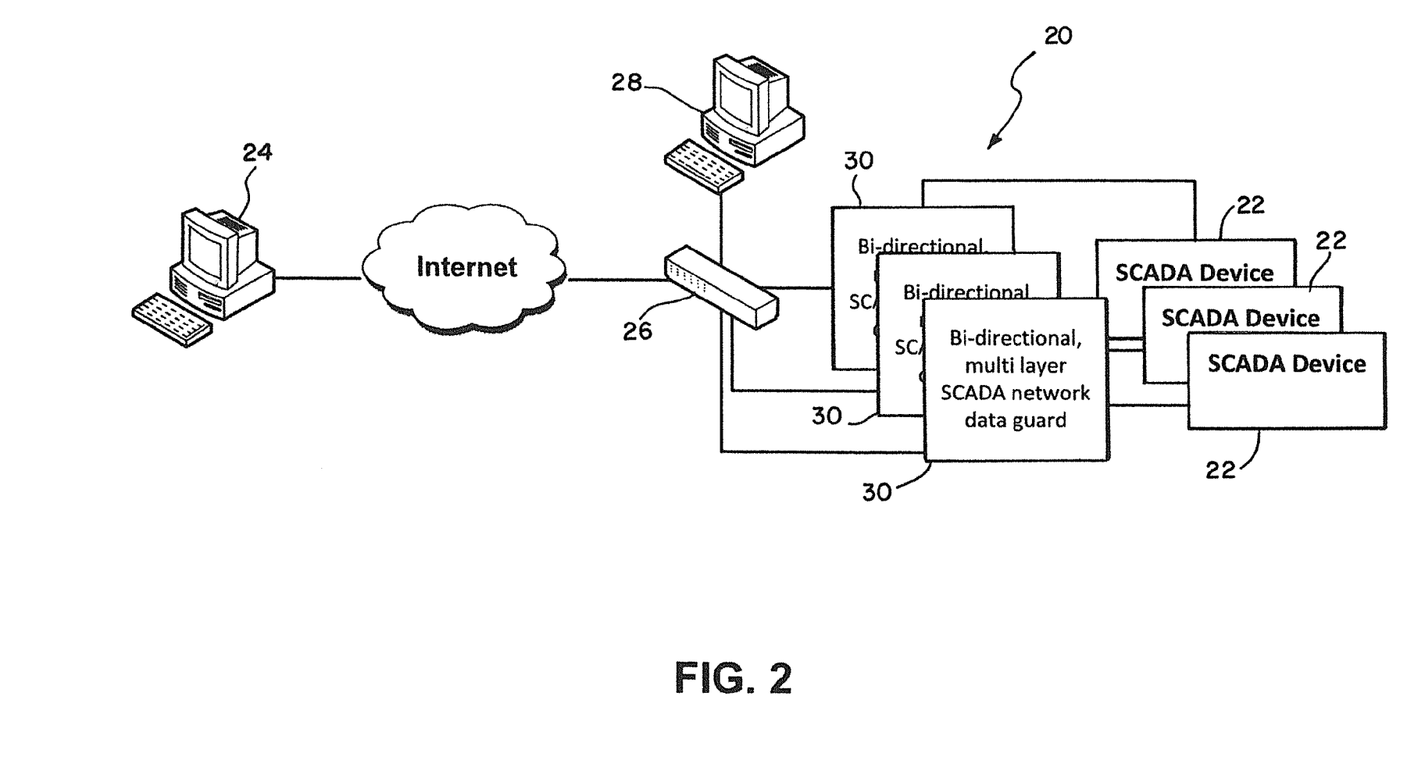
FIG. 2 is a simplified semi-schematic representation of a SCADA network including cyber-security devices according to the present disclosure.

FIG. 2 shows a SCADA network 20 that includes a plurality of SCADA devices 22 linked to an external or remote SCADA control terminal 24 by a network communication device 26, such as, for example, a router. Communication between the remote terminal 24 and the communication device 26 may be through the Internet (as shown), or alternatively, through a Local Area Network (LAN) or a Wide Area Network (WAN). A local or internal SCADA control terminal 28 may also be linked to the SCADA devices 22 and the external control terminal 24 by the communication device 26.

The network 20 differs from the network 10 of FIG. 1, as described above, primarily by the provision of one or more cyber-security devices or "data guards" 30, in accordance with this disclosure. The data guards 30, which will be described in detail below, are installed between the SCADA devices 22 and the communication device 26, whereby all data communicated to or from each SCADA device passes through, and is processed by, one data guard 30, as will be described below. Preferably, a single data guard device 30 is operationally associated with each SCADA device 22, so that each SCADA device 22 has its own dedicated data guard device 30, but other configurations may be suitable, depending on the particular application. Thus, a network may be configured, for example, with one data guard device 30 operationally associated with two or more SCADA devices 22.

Figure 3:
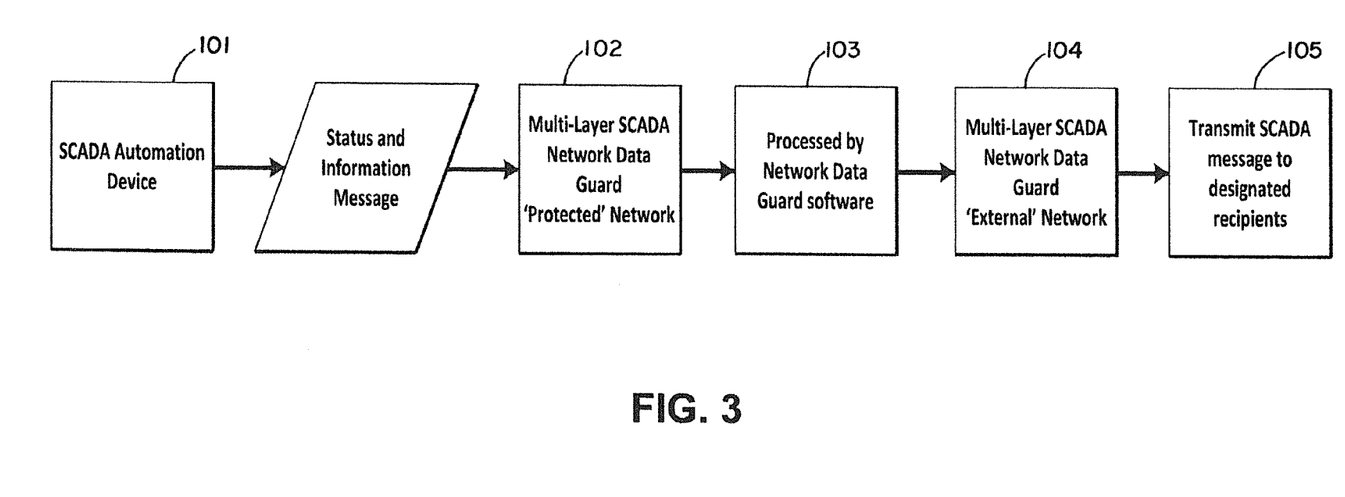
FIG. 3 is a generalized, high-level flow chart representing the flow of data outward from the SCADA devices to the remote terminal in the network of FIG. 2.
Figure 4:
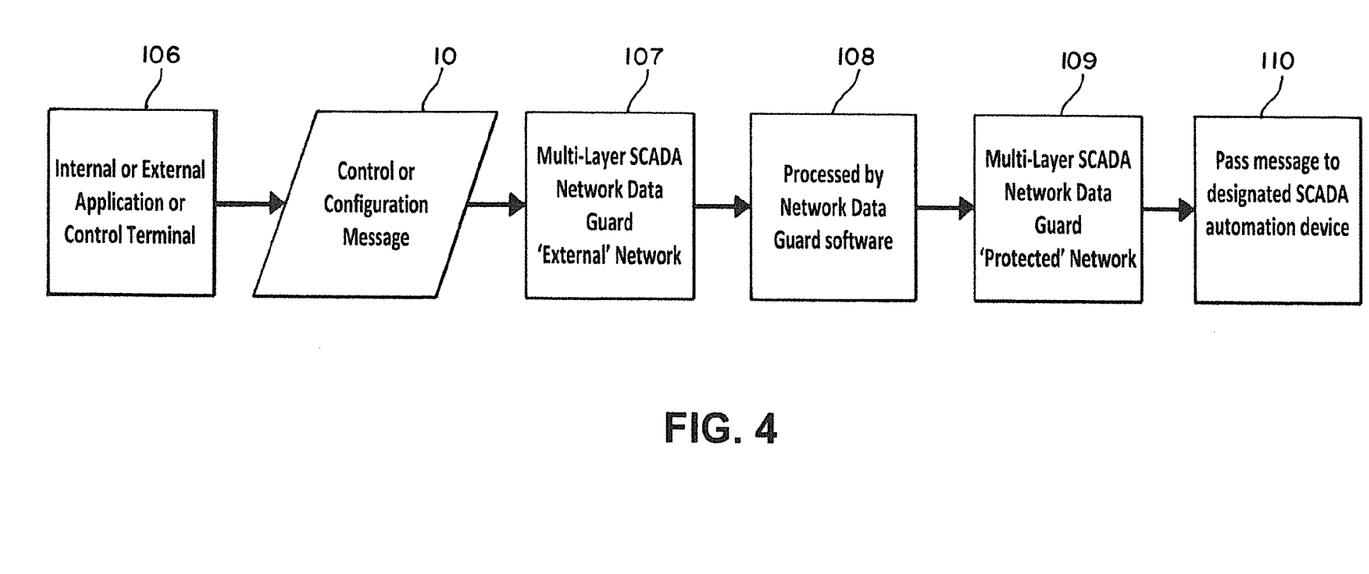
FIG. 4 is a generalized, high-level flow chart representing the flow of data from the remote terminal to one or more of the SCADA devices in the network of FIG. 2.

FIGS. 3 and 4 show generally the flow of data into and out of a data guard device 30. In FIG. 3, outbound data (information and/or messages) are generated (step 101) by one of the SCADA devices 22. The data may represent status information and/or messages acquired by the SCADA device 22 from the automation and control system (not shown) in which the SCADA device 22 is installed. The SCADA-generated data are received by the data guard device 30 (step 102) through a protected internal communication interface, preferably an Ethernet interface. The data are then processed (step 103) by validation software in the data guard device 30, first to screen out any data deemed invalid or malformed ("unqualified" data) based on a rule-set in accordance with a predefined SCADA protocol that is established by the security software installed in the data guard device 30. Any unqualified data are blocked or dropped, and a corresponding event log entry may advantageously be created. Well-formed ("qualified") data are then validated against the rule-set established by the security software to assure compliance with the data validation criteria established by the rule-set. Any data that are not in compliance with the validation criteria are deleted or blocked, and an event log entry may advantageously be created. Only data that are validated by compliance with the validation criteria are passed (step 104) to a protected external communication interface (e.g., an Ethernet interface) and then to a control network (e.g., a LAN or WAN), and finally to one or more designated recipients (step 105), which may include the remote SCADA control terminal 24 and, if present, the local SCADA control terminal 28.

In FIG. 4, inbound data, from, for example, the remote SCADA control terminal 24 and/or the local SCADA control terminal 28 (step 106) are received by the protected external communication interface (step 107) and then processed (step 108) as described above with reference to FIG. 3. Only data that are validated by compliance with the validation criteria are passed (step 109) to the protected internal communication interface (described below) and then to the designated SCADA device 22 via an appropriately configured network connection (step 110).

Figure 5:
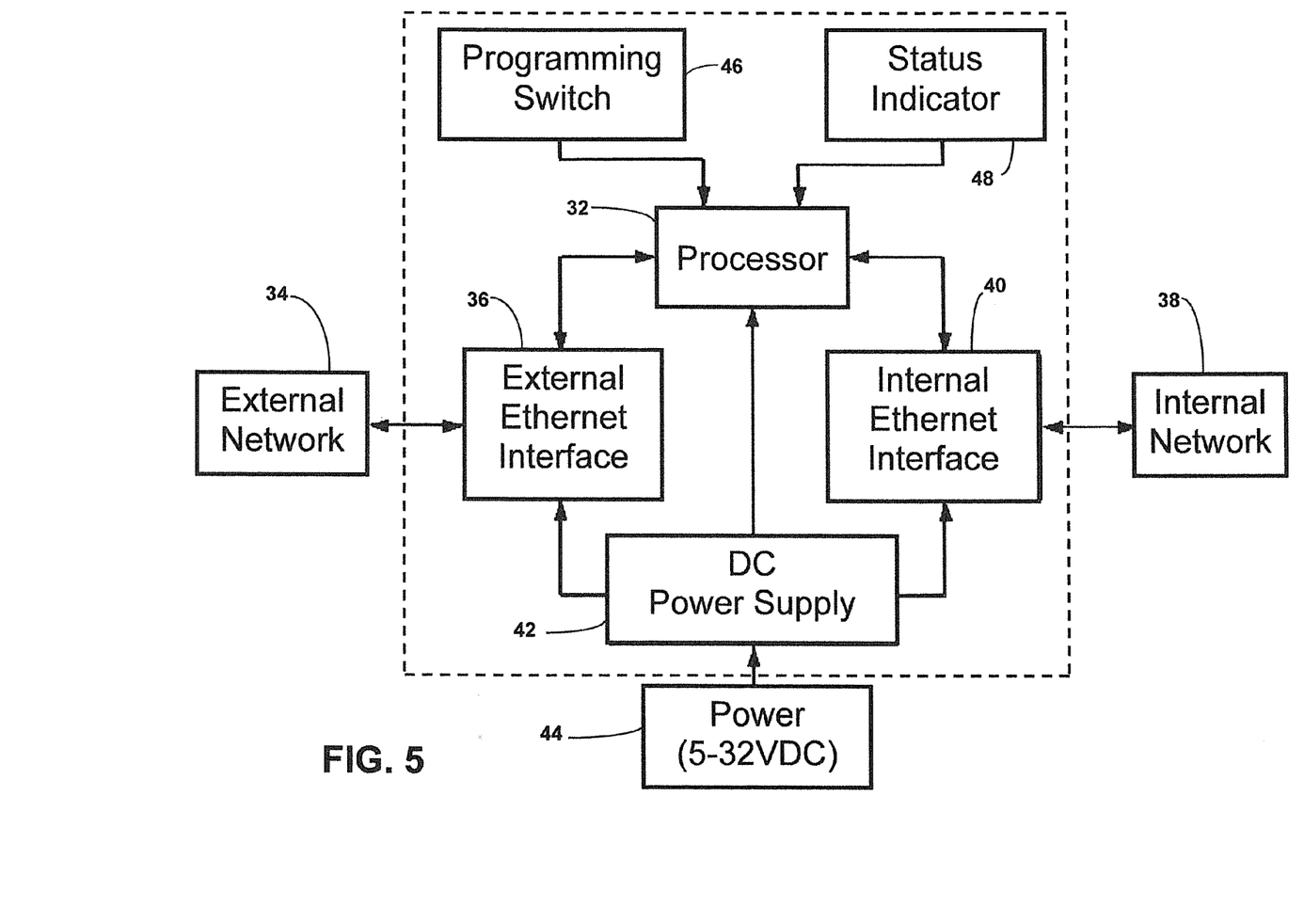
FIG. 5 is a diagrammatic representation of an embodiment of a cyber-security device in accordance with the present disclosure.

FIG. 5 schematically illustrates the cyber-security or "data guard" device 30 as installed in an automation and control network. The device 30 includes a processor 32 that communicates with an external network 34 by means of an external communication interface, e.g., an external Ethernet interface 36, and with an internal network 38 by means of an internal communication interface, e.g., an internal Ethernet interface 40. Power is provided by a DC power supply 42 that is connectable to any suitable external power source 44 delivering electrical power at 5 to 32 VDC, and that converts the voltage from the source 44 to a voltage suitable for operating the electronic components of the device 30.

As discussed above, the processor 32 is programmable with a rule-set that validates both inbound data that is received from the external Ethernet interface 36, and outbound data that is received from the internal Ethernet interface 40. Preferably, as mentioned above, inbound and outbound data are processed by two separate rule-sets that may be separately programmed into the processor 32. Programming and re-programming are accomplished via the Ethernet through the external Ethernet interface 36 only when the device 30 is in a programming mode initiated by the activation of a programming switch 46 during boot-up of the processor 32. In a preferred embodiment, the programming switch 46 is a physical (i.e., hardware) switch that can be actuated manually. For example, the programming switch 46 may be a button, lever, plunger, blade, or the like that can be accessed by a tool (not shown) inserted through an aperture in the housing (not shown) containing the electronic components. Thus, any alteration, whether benign or malicious, of the operational software of the device 30 requires physical access to the device 30. Initiation of the programming mode allows the processor 32 to upload a digitally-authenticated rule-set file received in an encrypted programming signal. After uploading the rule-set file, the device 30 is allowed to go through a complete power cycle to enter its operational mode as programmed with the new rule-set. A status indicator 48 (preferably a visual indicator such as an LED) may optionally be employed to indicate whether the device 30 is in the programming mode or the operational mode.

It can be seen from FIG. 5 that the external Ethernet interface 36 and the internal Ethernet interface 40 are physically and electrically isolated from each other, and can communicate with each other only through the processor 32. This assures that data cannot pass to or from the SCADA devices 22 on the internal network 38 without being validated by the rule-set(s) programmed into the processor 32, thereby providing date security that encompasses all seven OSI model layers.

The functional components of the data guard device 30, as described above, are housed in an enclosure (not shown) that is advantageously made of a suitable metal alloy, such as, for example, aircraft grade 6061-T6 aluminum alloy. The above-described electronic components are advantageously potted in a thermally-conductive encapsulant that provides a certain level of tamper protection along with a degree of thermal and vibrational resistance.

Figure 6:
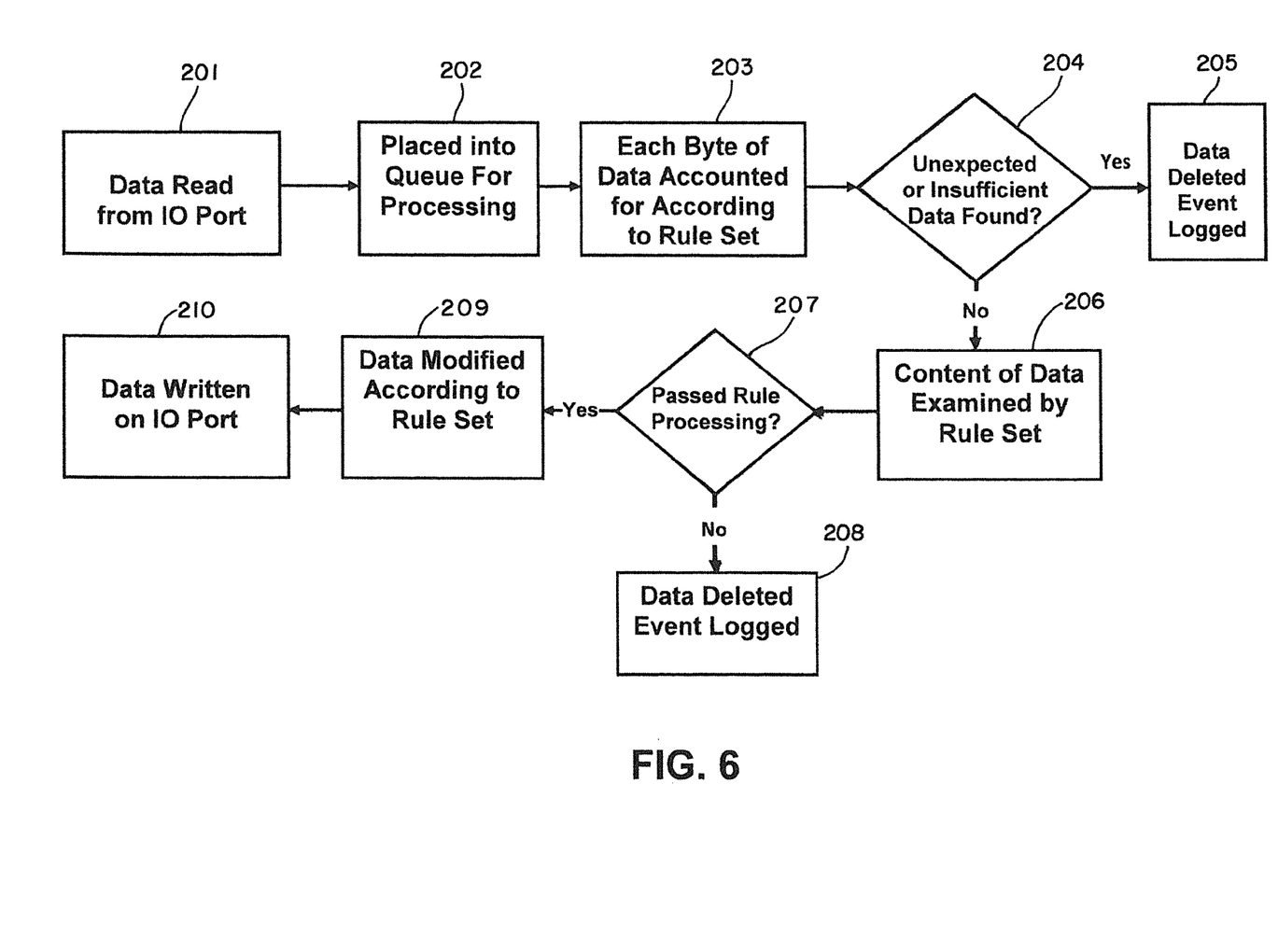
FIG. 6 is a flow chart representing the steps of validating data in accordance with the present disclosure.

FIG. 6 is a data flow diagram for the data validation software used in the cyber-security device 30. Data are read (step 201) from a first input/output (I/O) port operationally associated with either the external Ethernet interface 36 or the internal Ethernet interface 40, depending on whether the data are inbound or outbound. After the data inputted to the I/O port are read, the data are queued for processing (step 202), and then qualified (step 203) (preferably byte-by-byte) by a rule-set, as described above, to determine the presence of malformed or unexpected data ("unqualified" data). If any unqualified data are found ("YES" in decision step 204), such data are deleted, and a log entry is created (step 205). If no such unqualified data are found ("NO" in decision step 204), or if the unqualified data have been deleted in step 205, the content of the qualified data is examined in accordance with the rule-set (step 206) to determine compliance with the validation criteria. If non-compliance is determined ("NO" in decision step 207), the data are deleted, and a log entry is created (step 208). If the data are found to be compliant with the validation criteria, i.e., the data are determined to be valid ("YES" in decision step 207), the data may optionally be modified (as needed) in accordance with any further criteria that may be established by the rule set (step 209), then written (step 210) on a second I/O port operationally associated with whichever of the Ethernet interfaces 36, 40 was not used in the reading step (step 201), and finally outputted from the I/O port to the appropriate Ethernet interface.

An exemplary rule-set that may be used in some embodiments of this disclosure may be generically described as including the following logical processes operating on message data read from an I/O port:

In the first process, the message header is read to determine and verify the message type and the expected message header length and version to validate integrity of the message. This process includes (a) reading the Start of Message byte sequence where applicable; (b) reading N bytes (where N is the number of bytes defined in the rule-set for that message format), indicating the start of the message that comprises the header; and (c) verifying that the header is valid, that there are no illegal values or extra characters in the message, and that all required fields are present and match requirements defined in the rule-set In the second process, the contents of the message payload data are looped through to assure that only allowed fields are present in the message and that they conform to limits defined in the rule-set. This process includes repeating a sequence of sub-steps through the entire contents of the message data payload or until an invalid message is detected, or the total amount of data read matches or exceeds the expected message packet size. The sequence of sub-steps comprises: (1) reading M binary bytes that comprise a data field identifier; (2) reading the value and contents of the data field; (3) assuring that the data field is allowed by rule-set; and (4) if allowed, assure that the value of that data is within limits and ranges defined in the rule-set.

The second process also advantageously includes comparing the total size of the data read to the message packet size specified in the header to assure that no extra data have been inserted and that no potential data overflows are possible.

The above-described generic rule-set is exemplary only, and is not limiting. Variations and modifications of the exemplary rule-set will readily suggest themselves for particular applications.

From the foregoing description, it will be appreciated that data guard device 30 cannot be configured or otherwise modified by users over an internal or external network without physical access to the device. Therefore, the security provided by the data guard device cannot be overridden or by-passed, even if other protections, such as a firewall or IDS, are compromised.

Significantly, the data guard device 30 provides bi-directional protection across all seven OSI model layers. This is achieved through the use of two segregated network interfaces providing physical and data-link layer protection between each SCADA device 22 and the control network. Furthermore, the data guard device 30 protects the network and transport OSI model layers by limiting network data traffic to only the configured IP addresses and ports to and from each individual SCADA device. In addition, the data guard device 30 protects the session, presentation, and application OSI model layers through data validation and rule-sets that define what data can be sent to and from each SCADA device 22. Moreover, the data guard device 30 does not modify the message protocol, utilize a proxy, or require any modification to existing software or hardware on the SCADA network. Finally, the re-programmable feature described above allows the data guard device 30 to support custom rule-sets and configurations to tailor it to any SCADA device and network.

What is claimed is:

1. A cyber-security device for providing secure communication of supervisor control and data acquisition (SCADA) or automation protocol data between an external network and an internal network, the cyber-security device comprising:
    an external communication interface configured to send IP network data packets to, and receive IP network data packets from, the external network;
    an internal communication interface configured to send IP network data packets to, and receive IP network data packets from, the internal network;
    a processor in communication with the external communication interface and the internal communication interface, the processor being operable in a programming mode and in an operational mode, the processor being operable in the operational mode to process the IP network data packets in accordance with a processor-implemented rule-set configured for (a) qualifying, byte-by-byte, (i) the content of each of the IP network data packets received from the external network via the external communication interface as conforming to qualification criteria defined by the rule-set for external-to-internal communications, and (ii) the content of each of the IP network data packets received from the internal network via the internal communication interface as conforming to qualification criteria defined by the rule-set for internal-to-external communications, (b) validating, byte-by-byte, the content of each qualified IP network data packet to determine data message validity in accordance with the rule set, (c) passing to the internal communication interface qualified and validated IP network data packets received from the external communication interface, and (d) passing to the external communication interface qualified and validated IP network data packets received from the internal communication interface;
wherein the processor is re-programmable with a new rule-set only in the programming mode, whereby, in the programming mode, the processor is configured to load a new rule-set, and, after loading the new rule-set, to cycle to the operational mode; and
a physical switch operable to initiate the programming mode of the processor.

2. The cyber security device of claim 1, wherein the processor-implemented rule set includes a first rule set configured to process IP network data packets received from the external network, and a second rule set configured to process IP network data packets received from the internal network.

3. The cyber-security device of claim 1, further comprising a power supply operatively associated with the processor and configured for connection to an external power source providing a DC voltage within a predetermined voltage range, and for supplying the processor with a fixed operational DC voltage converted from the DC voltage provided by the external power source.

4. The cyber-security device of claim 3, wherein the predetermined voltage range is 5 to 32 volts.

5. The cyber-security device of claim 1, further comprising a status indicator configured to provide an indication of whether the processor is in the operational mode or in the programming mode.

6. The cyber-security device of claim 1, wherein at least one of the external communication interface and the internal communication interface is an Ethernet interface.

7. A method for providing secure communication of supervisor control and data acquisition (SCADA) or automation protocol data between an external network and an internal network, the method comprising:
providing a processor programmed with a processor-implemented rule-set configured for qualification and validation of the content of IP network data packets, the rule-set defining data qualification and validation criteria, wherein the processor has an operational mode and a programming mode;
inputting incoming IP network data packets from the external network into the processor;
implementing the rule-set, when the processor is in the operational mode, to qualify, on a byte-by-byte basis, the content of each incoming IP network data packet received from the external network to assure compliance with the data qualification criteria defined by the rule set;
implementing the rule-set, when the processor is in the operational mode, to validate, on a byte-by-byte basis, the content of each qualified incoming IP network data packet to assure compliance with the data validation criteria defined by the rule-set;
outputting from the processor to the internal network only those incoming IP network data packets the contents of which have been qualified and validated;
inputting data outgoing IP network data packets from the internal network into the processor;
implementing the rule-set, when the processor is in the operational mode, to qualify, on a byte-by-byte basis, the content of each outgoing IP network data packet received from the internal network to assure compliance with the qualification criteria defined by the rule-set;
implementing the rule-set, when the processor is in the operational mode, to validate, on a byte-by-byte basis, the content of each qualified outgoing IP network data packet to assure compliance with the data validation criteria defined by the rule-set;
outputting from the processor to the external network only those outgoing IP network data packets the contents of which have been qualified and validated; and
re-programming the processor with a new rule-set only when the processor is in the programming mode, wherein the re-programming is performed by:
initiating the programming mode;
loading a new rule-set into the processor while the processor is in the programming mode; and
cycling the processor to the operational mode after loading the new rule set.

8. The method of claim 7, wherein the rule-set includes a first rule-set configured to process the incoming IP network data packets received from the external network, and a second rule-set configured to process the outgoing IP network data packets received from the internal network.

9. The method of claim 7, wherein the qualification of the content of the incoming and outgoing IP network data packets comprises:
determining the presence, in each IP network data packet, of unqualified content that is not in compliance with the qualification criteria defined by the rule-set; and
deleting any unqualified content determined to be present.

10. The method of claim 9, wherein the validation of the content of the incoming and outgoing IP network data packets comprises:
examining, in accordance with the validation criteria defined by the rule-set, the qualified content of the IP network data packets that has not been deleted, to determine compliance of the qualified content with the validation criteria defined by the rule-set; and
deleting any content determined to be non-compliant with the validation criteria defined by the rule-set.

11. The method of claim 10, wherein the validation further comprises, after examining the qualified content of the IP network data packets, modifying at least some of the qualified content that has not been deleted so as to be compliant with further validation criteria defined by the rule-set.

12. The method of claim 10, further comprising creating a log entry in response to the deletion of unqualified content and/or non-compliant content.

13. The method of claim 7, wherein the loading is performed via an Ethernet interface.

14. The method of claim 7, wherein the switching is performed with a hardware switch operably associated with the processor.

15. An automation and control system, comprising:
an external network including an external control terminal;
an internal network including a supervisor control and data acquisition (SCADA) device;
a processor in data communication with the external network and the internal network, the processor being operable in a programming mode and in an operational mode, the processor being operable in the operational mode to process IP network data packets received from the external and internal networks in accordance with a processor-implemented rule-set configured for (a) qualifying, byte-by-byte, (i) the content of each of the IP network data packets received from the external network as conforming to content qualification criteria defined by the rule-set for external-to-internal communications, and (ii) the content of each of the IP network data packets received from the internal network as conforming to qualification criteria defined by the rule-set for internal-to-external communications, (b) validating, byte-by-byte, the content of each qualified IP network data packet to determine data message validity in accordance with the rule set, (c) passing to the internal network qualified and validated IP network data packets received from the external network, and (d) passing to the external network qualified and validated IP network data packets received from the internal network;

wherein the processor is re-programmable with a new rule-set only in the programming mode; and a physical switch operable to initiate the programming mode, whereby the processor is configured to cycle to the operational mode after it has been re-programmed with the new rule-set.

16. The system of claim 15, wherein the processor-implemented rule set includes a first rule set configured to process IP network data packets received from the external network, and a second rule set configured to process IP network data packets received from the internal network.

17. The system of claim 15, wherein the processor is in data communication with the external network via an external Ethernet interface, and wherein the processor is in data communication with the internal network via an internal Ethernet interface.

18. The system of claim 17, wherein the processor is re-programmable via the external Ethernet interface.

19. The system of claim 15, further comprising a power supply operatively associated with the processor and configured for connection to an external power source providing a DC voltage within a predetermined voltage range, and for supplying the processor with a fixed operational DC voltage converted from the DC voltage provided by the external power source.

20. The system of claim 19, wherein the predetermined voltage range is 5 to 32 volts.

21. The system of claim 15, further comprising a status indicator configured to provide an indication of whether the processor is in the operational mode or in the programming mode.

* * * * *